April 25, 1933.   W. HARRIES   1,905,703
CONTACT RECTIFIER
Filed Dec. 5, 1930
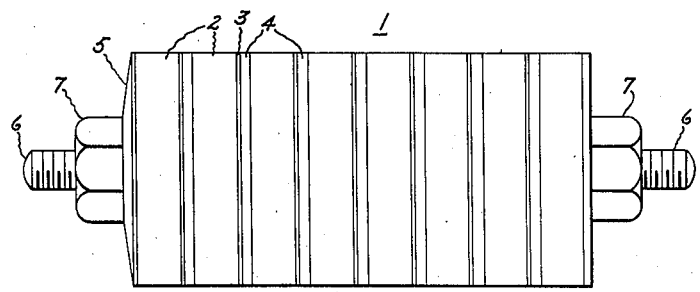
Inventor:
Wolfgang Harries,
by Charles E. Mullen
His Attorney.

Patented Apr. 25, 1933

1,905,703

UNITED STATES PATENT OFFICE

WOLFGANG HARRIES, OF JENA, GERMANY, ASSIGNOR TO GENERAL ELECTRIC COMPANY, A CORPORATION OF NEW YORK

CONTACT RECTIFIER

Application filed December 5, 1930, Serial No. 500,404, and in Germany December 12, 1929.

My invention relates to rectifiers of the type in which rectifier elements having the form of dry, metallic disks are compressed by a bolt passing therethrough, and has for its principal object the provision of a rectifier structure in which the thermal expansion of the disks is made substantially equal to that of the compressing bolt.

In the use of rectifiers of the contact or dry plate type the serious disadvantage has been encountered that, by reason of the considerable temperature fluctuations occurring in the structure of the rectifier during operation, correspondingly large changes in the contact pressure between the plate elements occur which are to be attributed to the differing rates of thermal expansion in the plates and bolt.

It has already been proposed to avoid this difficulty by constructing the bolt holding the rectifier plates or disks together and the rectifier plates themselves respectively of materials having equal or approximately equal thermal coefficients of expansion. But this obvious idea of constructing the rectifier plates and the compressing bolt therefor of like material can not be put into practice without in turn involving other disadvantages, since in usual well-known contact rectifier constructions, the material commonly chosen as the carrier for the active material is copper, which is out of the question for the manufacture of the bolt.

In practice, therefore, a material has been used generally heretofore for the rectifier plate carrying the active material different from that used for the bolt which compresses these plates and, consequently, it has been necessary to take into account and make provision for the difference in thermal expansion between these structural parts. Furthermore, in many cases, in addition to the plates or disks carrying the active layers of material, other plates are employed, each in contact with one of the layers. These contact plates are frequently lead, since this soft metal ensures a good contact with the active material, but may be of other material.

In accordance with my invention the difficulties above noted are avoided by the provision of plates carrying the active material and of plates in contact with the material of such thickness that the resulting thermal expansion of the whole assembly of rectifier plates conforms substantially to that of the compressing bolt. In case the thickness of the active layer is not negligible compared with the sum of the thicknesses of the plate carrying the active material and of the contact plate, the thermal expansion of this active layer may also be taken into account in determining the thickness of the plates and layers. Further, in certain cases it may be advisable to provide washers in the assembly of rectifier plates, these washers then being of such material and thickness that a thermal expansion of the assembly of rectifier plates and washers may be obtained which is substantially equal to that of the compressing bolt.

By a simple mathematical calculation it can be shown that a certain proportion must exist between the thickness of the plate members of the rectifier assembly and the differences between the coefficients of expansion for these plates and for the bolt, if there is to be conformity in the thermal expansion of the rectifier system as a whole.

My invention will be better understood from the following description when considered in connection with the accompanying drawing and its scope will be pointed out in the appended claims.

Referring to the drawing, the single figure thereof illustrates a contact rectifier in which my invention has been embodied.

In the figure the rectifier 1 comprises the disks or plates 2 each coated with a layer 3 of active material, the contact disks or plates 4 each mounted between the coated side of one of plates 2 and the uncoated side of the adjacent plates, the plates or washers 5 forming spacing or pressure-transmitting members, and a bolt 6, provided with nuts 7, for compressing the rectifier plate members together. Each set of plates 2, 3 and 4 forms a rectifying unit and the complete rectifier comprises a plurality of these units held together under suitable pressure by the bolt 6.

As an example in determining the proper thickness of plate elements in the rectifier, let the thickness of each coated plate 2 and each contact plate 4 be $d_1$ and $d_2$ respectively and the coefficients of expansion thereof be respectively $a_1$ and $a_2$. Let the length of that part of bolt 6 which is covered by the plates 2 and 4 be $d_3$ and the coefficient of expansion of the bolt material be $a_3$. Then $d_1 + d_2 = d_3$.

The total increase in thickness of plates 2 and 4 for one degree of temperature is $$(a_1)(d_1) + (a_2)(d_2).$$

The corresponding change in length of the bolt 6 is $(a_3)(d_3) = a_3(d_1 + d_2)$.

If both expansions, that of the plate assembly and that of the bolt, are to be of equal magnitude, the following equation must apply:

$$(a_1)(d_1) + (a_2)(d_2) = a_3(d_1 + d_2),$$
$$(d_1)(a_1 - a_3) = (d_2)(a_3 - a_2);$$

or $$\frac{d_1}{d_2} = \frac{a_3 - a_2}{a_1 - a_3}$$

In well known contact rectifiers, in many cases copper is used as the material for the plates 2 carrying the active material 3, lead for the contact plates 4, and brass for the washers 5 and bolt 6. The thermal coefficient of expansion of copper, $a_1$ is 0.0000167; that of lead, $a_2$, is 0.0000293, and that of brass, $a_3$, is 0.0000188. Therefore, from the above equation, a rectifier plate assembly is obtained whose thermal expansion is equal to that of the bolt 6 if the relationship of thickness of the copper plates 2 and lead plates 4 is approximately as follows:

$$\frac{d_{cu}}{d_{pb}} = \frac{293 - 188}{188 - 167} = \frac{105}{21}$$

It will be seen that the resulting thickness of the lead portion of the total lead and copper plate assembly in the above example is about 16.7% of the thickness of this total. It is generally sufficient in practice if the proportion of the lead in the total thickness of lead and copper ranges between 12% and 20%.

In the foregoing numerical example of the plate thickness the layers of active material 3 have been assumed to be so thin that the thermal expansion thereof is negligible.

In many cases it may be advisable to utilize a resilient washer or resilient washers in a well known manner, as by mounting a washer 5 at the ends of the assembly of plates 2 and 4 and so forming this washer as to obtain the desired resiliency, in order to compensate for any slight differences which may still exist between the thermal expansion of the assembly of plates 2 and 4 and that of the bolt 6.

What I claim as new and desire to secure by Letters Patent of the United States, is:

1. In a contact rectifier, a plurality of rectifier units and a bolt arranged to compress said units, each of said units including a plate composed of a material having a coefficient of expansion substantially different from that of the material of said bolt, said plate having a layer of active material thereon, each of said units further including a plate in contact with said active material, said plates being of such thickness and of such material that the thermal expansion of said plurality of rectifier units is substantially equal to that of said bolt.

2. In a contact rectifier, a plurality of plates each having a layer of active material thereon, a plurality of plates composed of a material having a coefficient of expansion substantially different from that of the material of said first-named plates, each of said second-named plates being in contact with a different one of said layers of active material, a plurality of plates composed of a third material, and a bolt composed of a material having a substantially different coefficient of expansion from that of the material of said first and second named plates, said bolt being arranged to compress all of said plates, said plates being of such thickness that the total thermal expansion of all said plates taken together is substantially equal to that of said bolt.

3. In a contact rectifier, a plurality of rectifier units and a bolt arranged to compress said units, each of said units including a plate composed of a material having a coefficient of expansion substantially different from that of the material of said bolt, said plate having a layer of active material thereon, each of said units further including a plate in contact with said active material, said plates and said layer being of such thickness and of such material that the thermal expansion of said plurality of rectifier units is substantially equal to that of said bolt.

4. In a contact rectifier, a plurality of copper plates each having a layer of active material thereon, a plurality of lead plates each in contact with a different one of said layers of active material, a plurality of brass plates and a brass bolt arranged to compress said plates, the ratio of the total thickness of said copper plates to the total thickness of said lead plates being between 88:12 and 80:20.

5. In a contact rectifier, a plurality of plates each having a layer of active material thereon, a plurality of plates composed of a material having a coefficient of expansion substantially different from that of the material of said first-named plate, each of said second-named plates being in contact with a different one of said layers of active material, a plurality of washers composed of a third material, and a bolt composed of a material having a coefficient of expansion substantially different from that of the material of said first-named plates, said bolt being arranged to compress all of said plates and said washers, said plates and washers being of such thickness that the total thermal expansion of all said plates and washers taken together is substantially equal to that of said bolt, at least one of said washers being resilient to compensate small differences between the expansion of said plates and washers and that of said bolt.

6. In a contact rectifier, a plurality of rectifier units and a bolt arranged to compress said units, each of said units including a plate composed of a material having a coefficient of expansion substantially different from that of the material of said bolt, said plate having a layer of active material thereon, each of said units further including a plate in contact with said active material, the ratio of the thickness of each of said first-named plates to the thickness of each of said second-named plates being substantially equal to the ratio of the difference between the coefficients of expansion of the material of said second-named plates and of the material of said bolt to the difference between the coefficients of expansion of the material of said bolt and of the material of said first-named plates, whereby the thermal expansion of said plurality of rectifier units is substantially equal to that of said bolt.

In witness whereof, I have hereunto set my hand this 18th day of November, 1930.

WOLFGANG HARRIES.